(12) United States Patent
Koudar

(10) Patent No.: US 9,151,840 B2
(45) Date of Patent: Oct. 6, 2015

(54) SEMICONDUCTOR DEVICE AND METHOD OF FORMING SAME FOR ACOUSTIC SENSING OF CLOSE PROXIMITY OBJECTS

(71) Applicant: Ivan Koudar, Modrice (CZ)

(72) Inventor: Ivan Koudar, Modrice (CZ)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 481 days.

(21) Appl. No.: 13/790,419

(22) Filed: Mar. 8, 2013

(65) Prior Publication Data

US 2013/0235700 A1    Sep. 12, 2013

Related U.S. Application Data

(60) Provisional application No. 61/609,083, filed on Mar. 9, 2012.

(51) Int. Cl.
*G01S 15/08* (2006.01)
*G01S 7/52* (2006.01)

(52) U.S. Cl.
CPC .............. *G01S 15/08* (2013.01); *G01S 7/52004* (2013.01); *G01S 7/52026* (2013.01)

(58) Field of Classification Search
CPC .. G01S 15/08; G01S 7/52026; G01S 7/52004
See application file for complete search history.

(56) References Cited

U.S. PATENT DOCUMENTS

| | | | | |
|---|---|---|---|---|
| 4,991,146 A * | 2/1991 | Ransdell | ................ | G01S 15/04 367/98 |
| 8,416,641 B2 * | 4/2013 | Horsky | ................ | G01S 15/325 367/99 |
| 8,699,299 B2 * | 4/2014 | Horsky | ................ | G01S 15/10 367/95 |
| 8,982,668 B2 * | 3/2015 | Horsky | ................ | G01S 15/931 367/100 |
| 2009/0213696 A1 | 8/2009 | Koudar | | |
| 2011/0261652 A1 | 10/2011 | Horsky et al. | | |
| 2011/0267924 A1 | 11/2011 | Horsky et al. | | |
| 2012/0120768 A1 | 5/2012 | Horsky et al. | | |
| 2013/0235700 A1 * | 9/2013 | Koudar | ................ | G01S 15/08 367/99 |

* cited by examiner

*Primary Examiner* — Daniel Pihulic
(74) *Attorney, Agent, or Firm* — Robert F. Hightower

(57) ABSTRACT

In embodiments a circuit provides a circuit for use in detecting close proximity objects in an acoustic distance sensing system. The circuit produces a close proximity zone flag when the time after transmitting an acoustic distance sensing pulse corresponds to the defined close proximity range. The circuit can also include a time of flight counter for determining the time of flight of a received echo. The circuit can further produce a close proximity time if flight valid flag indicating that echoes are being received in close proximity time frame.

20 Claims, 4 Drawing Sheets

SEMICONDUCTOR DEVICE AND METHOD OF FORMING SAME FOR ACOUSTIC SENSING OF CLOSE PROXIMITY OBJECTS

CROSS REFERENCE TO PRIORITY APPLICATION

This application claims the benefit of provisional application 61/609,083, filed Mar. 9, 2012, the entirety of which is hereby incorporated by reference.

BACKGROUND

The invention relates generally to methods, semiconductor devices, electrical and electronic circuits, and products useful in acoustic distance measurement systems, and particularly acoustic echo distance measurement systems.

Acoustic distance sensing and distance measurement systems have been in use for years in a variety of applications. These systems generally operate by transmitting a short pulse of acoustic energy, creating a sound wave in the ambient air, and measuring the time it takes to receive an echo of the pulse, which indicates the distance to the object that reflected the acoustic pulse. The closer the echo-producing object, the shorter the time of arrival of the echo at the sensor after the transmission.

To commence transmission of an acoustic pulse, an electric signal is applied to an acoustic transducer to cause the operative part of the transducer to vibrate in correspondence with the electric signal. However, when the signal is ceased or removed from the transducer, the transducer continues to vibrate during a period referred to as "ringdown" or "reverberation." The duration of the reverberation depends on the quality factor of the transducer. During ringdown the frequency of the transducer vibration is at its natural or resonant frequency and the duration of this period depends on the quality factor of the transducer. If the frequency used to drive the transducer is not the same as the transducer's natural frequency, the vibration frequency of the transducer transitions from the driving frequency to the present natural frequency of the transducer during the reverberation period, and the magnitude of the transducer vibration decays during the reverberation period. In systems where the transducer is used for both transmitting and receiving, the ringdown or reverberation period typically prevents detection of echo signals received during the reverberation period (i.e. echoes produced by objects very close to the transducer). Practically, it can easily result in a flawed distance measurement (in case of multiple reflections which can overlap), or even a situation where an echo is missed completely because it is obscured by the reverberation or because the system just doesn't attempt echo detection during the reverberation period. Accordingly, there is a need to be able to detect echo signals received during the reverberation period of a transducer and to determine when multiple echoes are overlapping.

BRIEF DESCRIPTION OF THE DRAWINGS

There are shown in the drawings, embodiments which are presently preferred, it being understood, however, that the invention is not limited to the precise arrangements and instrumentalities shown.

Figure 1:
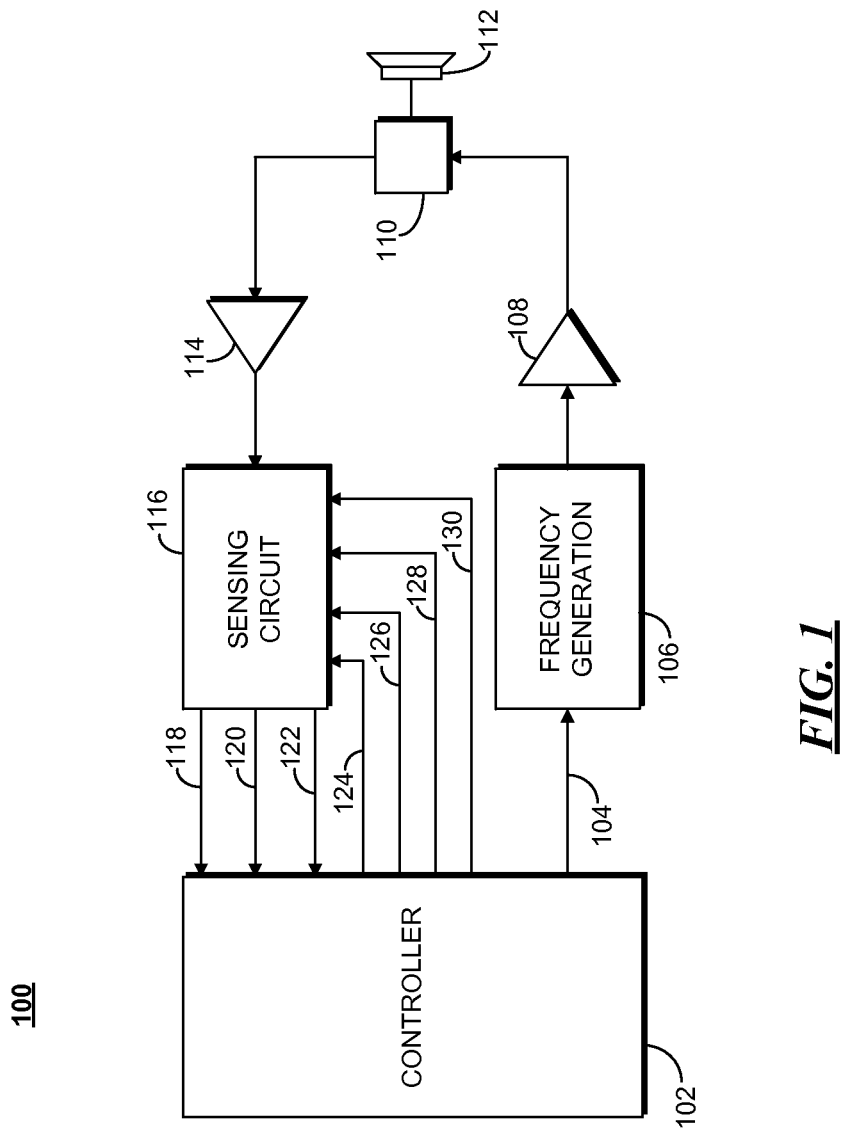
FIG. 1 shows a block diagram of an acoustic distance measuring system in accordance with some embodiments.

The drawings are meant to illustrate examples of some embodiments that can be implemented in accordance with the teachings herein. Variations within the teachings and the claims within the full scope of the embodiments will occur to those skilled in the art.

DETAILED DESCRIPTION OF THE DRAWINGS

While the specification concludes with claims defining features of embodiments that are regarded as novel, it is believed that such embodiments will be better understood from a consideration of the description in conjunction with the drawings. As required, detailed embodiments are disclosed herein; however, it is to be understood that the disclosed embodiments are, in general, exemplary. Some embodiments may be implemented in alternative forms. For example, the invention can be embodied as a semiconductor device or product, a circuit, or a method, including a method of forming a semiconductor device or circuit, among other embodiments. The various embodiments of semiconductor products and devices, and methods of forming and/or configuring them, as disclosed herein, can be fabricated using conventional techniques along with the novel processes and structures taught herein, and can include integrated or discrete circuit arrangements, or both. Therefore, specific structural and functional details disclosed herein are not to be necessarily interpreted as limiting, but as a basis for the claims and as a representative basis for teaching one skilled in the art to variously employ the invention in any appropriately detailed structure. Further, the terms and phrases used herein are not intended to be limiting but rather to provide an understandable description of the invention. However, where a definition is provided for a term or phrase, the provided definition should be used in interpreting the claims invoking the term or phrase. Terms referring to a singular form such as "a" may also be interpreted by those skilled in the art as including more than one, unless superficially indicated. Terms used to describe threshold operations, such as a signal "exceeding" a threshold will be recognized by those having skill in the art as including their inverse as the polarity of input signals can be changed. Thus, where a threshold operation is taught or recited, a signal "exceeding" the threshold simply means the signal value transitions from one range bounded by the threshold value to another range that may cause an action to commence or cease, as described. The actual signal value may be greater than or less than the threshold when the signal value "exceeds" or "overcrosses" the threshold.

Embodiments of the disclosed teachings include a semiconductor device useful in an acoustic distance sensing or distance measurement system, and can include a close proximity zone flag circuit operable to assert a close proximity zone flag while a present period of a received signal from an acoustic transducer is within a preselected range during a proximity window time period. The semiconductor device can further include a time of flight circuit operable to produce a time of flight count based on a time period when a stream of present periods of the received signal, after being low pass filtered, is greater than a preselected threshold value. The semiconductor circuit can further include a close proximity time of flight valid flag circuit operable to compare the instant time of flight to a valid threshold value and assert a close proximity time of flight valid flag when the time of flight count is inside the minimal and maximal threshold values.

The acoustic distance measuring system in the disclosed embodiments, in general, determines a distance to an object based on acoustic reflection, and in particular at close proximity distances that are not practical using convention techniques as known in the art. Acoustic reflection comprises transmitting an acoustic burst, and then determining the time of flight, which is the time from transmission of a burst or pulse until a reflection, or echo, of that pulse is received. Given that acoustic waves travel at relatively consistent velocities, and considering the relatively short distances over which acoustic distance measuring is performed, the time of flight alone can be substantially relied on to indicate the distance to an object producing an echo. Acoustic distance measuring systems have been employed a wide variety of applications, and particularly in automotive applications where they are used for collision avoidance, parking assistance, and automatic parking, among other uses. Prior art systems tend to be unable to detect objects or obstacles within a close proximity zone, leaving a "blind spot" in their detection range. Given that this is region nearest the transducer, it can cause problems in critical maneuvering. The acoustic distance measuring system 100 solves this problem by observing the close proximity time frame, the time of flight for an echo received in this time frame, and whether the time of flight is valid. In processing terms a close proximity zone flag and a close proximity time of flight valid flag are used in combination with the close proximity time of flight to determine the distance to a nearby obstacle in the close proximity zone.

FIG. 1 shows a block diagram of an acoustic distance measuring system 100 in accordance with some embodiments. A controller 102 substantially operates the system 100 via control signals, as well as by receiving signals from various components or processing elements of the system 100. For example, the controller 102 can provide a control signal 104 to a frequency generation circuit 106 that generates a signal at an acoustic frequency, typically and ultrasonic frequency. The frequency generation circuit 106 provides the ultrasonic frequency signal (as an electrical signal) to a transmitter amplifier 108. The transmitter amplifier 108 amplifies the power of the signal generated by the frequency generation circuit 106 and applies it to a transducer 112. The transducer can be a piezo device. In some embodiments the signal can be applied through an isolator 110. In some embodiments, the signal can be applied directly to the transducer without an isolator 110. The transducer 112 vibrates, and generates an acoustic signal, in correspondence with the signal applied by the transmitter amplifier 108. The acoustic signal generated by the transducer travels away from the transducer 112 thought the ambient air, and can be directed, such as by a horn or other acoustic wave director. The transducer 112, upon the driving signal applied by the transmitter amplifier 108 being ceased, will reverberate, and the reverberation will have an exponentially decaying magnitude. Upon ceasing the ultrasonic frequency signal from the transmitter amplifier 108, the receiving circuitry can commence monitoring the transducer 112 for echo signals. In particular, a receiver amplifier 114 can amplify signals received by the transducer 112. The isolator, if present, 110 prevents the high amplitude signals from the transmitter amplifier 108 from reaching the receiver amplifier 114, while allowing the high amplitude signals to reach the transducer 112, and allowing the low level signals produced by the transducer when receiving echo signals to reach the receiver amplifier 114. In some embodiments the signal generated by the transmitter amplifier 108 can be applied to the receiver amplifier 114 without an isolator 110. The receiver amplifier provides an amplified received signal to a sensing circuit 116. The sensing circuit 116 processes the amplified received signal, along with other inputs, to generate a close proximity zone flag 118, a close proximity time of flight valid flag 120, and a time of flight 122 (a time count value) that are provided to the controller 102 or an equivalent processing function. These three signals facilitate the controller 102 in determining obstacle distance in the close proximity zone that are not generally detectable with conventional acoustic sensing systems.

To operate, the sensing circuit 116 in some embodiments requires five inputs; the received signal from the receiver amplifier 114, a clock signal 124, a full scale value 126, a receive threshold value 128, and a valid distance interval value 130. The full scale value 126 is the maximum digital value able to be output by an analog to digital converter in the sensing circuit that converts the received signal from the receiver amplifier 114 to a digital received signal. The receive threshold value 128 is used to determine when the average period of the received signal corresponds to the transmitted frequency, which indicates an echo is being received. While the average period of a received signal corresponds to that of the transmitted frequency (within a given tolerance), the time of flight 122 is counted. The valid distance interval value 130 is a value corresponding to a valid distance repetition rate between echoes. If the repetition rate is within the valid distance interval value, then the close proximity time of flight flag 120 is set.

Figure 2:
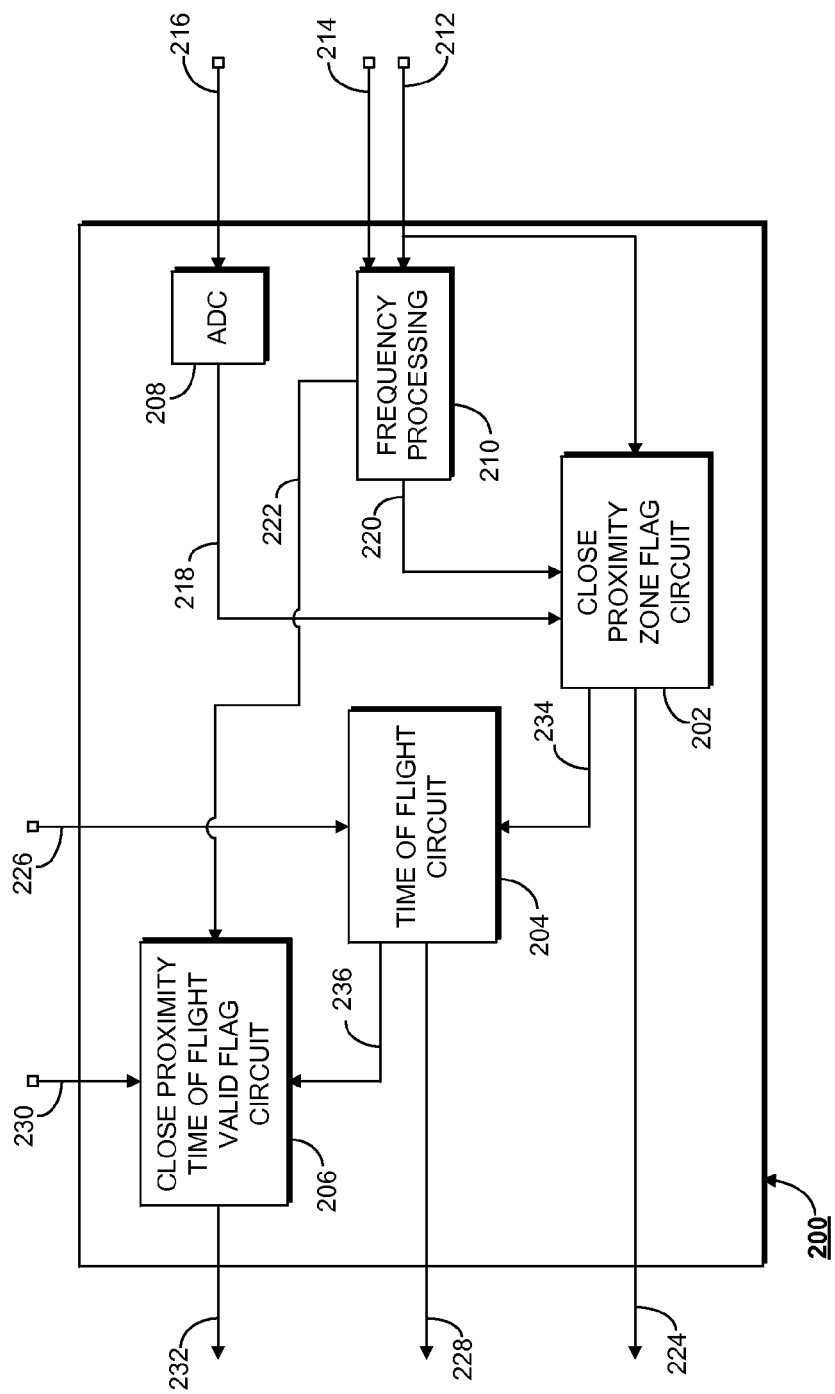
FIG. 2 shows a block diagram of a sensing circuit that indicates the validity of received signals in accordance with some embodiments.

FIG. 2 shows a block diagram of a sensing circuit 200 that indicates the validity of received echo signals in a close proximity zone, in accordance with some embodiments. The sensing circuit 200 includes several other circuits, or sub-circuits, including a close proximity zone flag circuit 202, a time of flight circuit 204, and a close proximity time of flight valid flag circuit 206. In some embodiments the sensing circuit 200 can also include support circuitry such as, for example, an analog to digital converter (ADC) 208, and frequency processing circuit 210. The sensing circuit 200 can be analogous to the sensing circuit 116 of FIG. 1, and likewise has inputs of a clock signal 212, a full scale value 214, and a received signal 216 from a receiver. The sensing circuit 200 also receives a receive threshold value 226 and a valid distance interval value 230. The sensing circuit 200, upon processing these inputs, provides as outputs a close proximity zone flag 224 from the close proximity zone flag circuit 202, a time of flight value 228 from the time of flight circuit 204, and a close proximity time of flight valid flag 232 from the close proximity time of flight valid flag circuit 206.

The received signal 216 is an analog signal resulting from the transducer (e.g. transducer 112) during a receiving time period, which commences after ceasing a transmission signal. The received signal 216 is fed to the ADC 208, which samples and digitizes the received signal to produce a digital received signal 218 which is a digital version of the received signal. The ADC 208 samples at a clock frequency that is substantially higher than the transmission frequency used to drive the transducer during transmission periods. The digital received signal 218 is fed to the close proximity zone flag circuit 202. The frequency processing circuit 210 receives the full scale value 214 and the clock signal 212. The clock signal 212 is further provided to the close proximity zone flag circuit 202 to clock an internal counter. The close proximity zone flag circuit 202 is operable to assert the close proximity zone flag 224 while a present period of a received signal 216 from the acoustic transducer is within a preselected range during a proximity window time period. The frequency processing circuit 210 generates a high frequency signal 220 that the close proximity flag circuit sums with the digital received signal 218 to detect received echoes by counting the major period of the summed signal. The high frequency signal 218 includes frequency content that is substantially higher that the transmitted frequency, and will thus be higher than the frequency of the received echoes. When an echo is presently being received, the major period of the summed signal (i.e. the digital received signal 218 summed with the high frequency signal 220) will be substantially that of the transmitted signal. When no echo is presently being received, the period of the summed signal will be that of the high frequency signal 220. The close proximity zone flag circuit 202, when an echo is presently being received, provides a stream of low pass filtered or averaged periods 234 to the time of flight circuit 204. To produce the close proximity zone flag 224, the close proximity zone flag circuit 202 sets the close proximity zone flag 224 when the stream of low pass filtered periods occurs in a proximity time window, which starts counting when the reverberation of the transducer falls to a threshold level after the driving signal is ceased. The time of flight circuit 204 produces the time of flight count 228, which is a count while the stream of low pass filtered periods 234 is above the receive threshold value 226. The time of flight circuit 204 also generates a count of repetitions 236 of the stream of low pass filtered periods 234, which must be lower than the valid distance interval value 230 for the close proximity time of flight flag 232 to be set.

Figure 3:
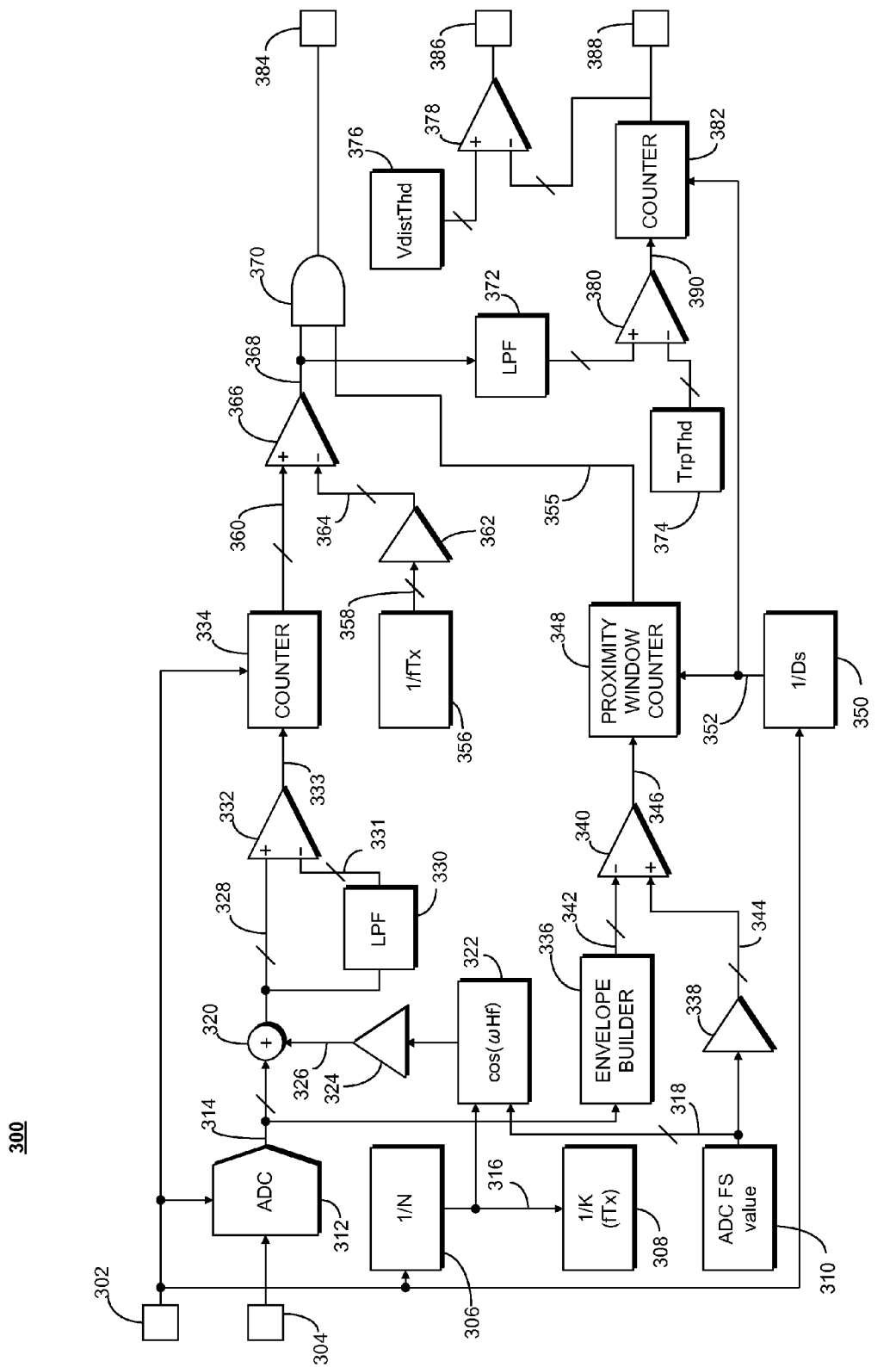
FIG. 3 shows a schematic diagram of a sensing circuit for acoustic sensing of close proximity objects in accordance with some embodiments.

Referring to FIG. 3, there is shown a schematic diagram of a circuit 300 for acoustic sensing of close proximity objects in accordance with some embodiments. The circuit 300 can be embodied in a semiconductor device, such as an integrated circuit, and is analogous to the sensing circuit 200 of FIG. 2. The circuit 300 includes both analog and digital signals and signal processing components. Accordingly, those of ordinary skill in the art will appreciate that the functional components shown here can be implemented in various forms, including as algorithms in a digital signal processor. Signal lines that have a slash ("/") through them can be implemented as a digital bus, or simply as digital values handled by a digital processor. The circuit 300 utilizes a sampling clock input 302 and an analog received signal input 304, as well as a full scale value input 310, a receive threshold value 374, and a threshold interval value 376. The circuit 300 provides outputs including a close proximity zone flag 384 provided by a close proximity zone flag circuit, a time of flight value 388 provided by a time of flight circuit, and a close proximity time of flight valid flag 386 provided by a close proximity time of flight valid flag circuit, as will be explained herein.

The sampling clock 302 is a digital clock or clock signal at a known sampling frequency used by the circuit 300 and other components of the acoustic distance sensing system utilizing the circuit 300. The analog received signal 304 is produced by a chain or circuit line-up formed with an acoustic transducer, transmitter and receiver. The circuit chain generates an acoustic distance sensing signal that is transmitted into the air via the transducer. The circuit chain further receives echoes of the acoustic distance sensing signal via the transducer. The circuit chain can correspond to that shown in FIG. 1, for example. The acoustic distance sensing signal is a burst or pulse, typically at an ultrasonic frequency. The burst is typically a simple sinusoidal signal at a selected frequency for a short duration. The acoustic transducer converts the electrical signal being transmitted into an acoustic signal, and converts received acoustic signals (i.e. acoustic energy that vibrates the acoustic transducer) into corresponding electrical signal, which includes received echo signals of the transmitted signal. Of particular interest to the present teachings, however, is the signal produced by the transducer immediately after ceasing a transmit burst or pulse applied to the transducer to generate a transmitted acoustic distance sensing signal pulse. When the electrical signal applied to the transducer to generate the acoustic distance sensing pulse is ceased, the transducer continues vibrating during a reverberation period, also known as "ringdown," and the reverberation magnitude decays exponentially over time. The reverberation is at the natural frequency of the transducer, thus even if the frequency of the transmitted acoustic pulse or burst was not at the transducer's natural frequency, the ringdown signal will quickly transition to the transducer's natural frequency during reverberation. The reverberation period typically has a short duration, and is typically over by the time echoes from all but very near objects are received. However, it is echoes from near objects, which are typically ignored in acoustic distance sensing, that are to be detected using the embodiments taught herein.

The analog received signal at 304 is sampled and digitized by an ADC 312 to produce a digital received signal 314 which is a digital version of the analog received signal 304. This signal may be gated on or off for distance sensing operations or it may run continuously. The digital received signal 314 is fed to a summing node 320 that sums the digital received signal 314 with a high frequency signal 326 to produce a summed signal 328. In some embodiments the summing node can be implemented as a hardware arithmetic circuit that adds the two signal magnitudes together, in other embodiments the summing node can be a software implementation that simply adds the signal magnitudes and updates a register or variable used for the summed signal 328. The high frequency signal 326 is a digital signal which includes frequency content that is at a higher frequency than echo signals in the received signal 304. That is, the high frequency signal 326 includes frequency content that is substantially higher than the transmitted frequency fTx. The high frequency signal 326 can be, for example, a sinusoid at a higher harmonic frequency of the sampling clock 302. In some embodiments the high frequency signal 326 can be a noise signal having frequency content that is higher in frequency than the frequency of the received signal 304. The summed signal 328 is fed to a zero crossing comparator 332, and is also applied to a low pass filter 330 to produce a low pass filtered version of the received signal 331, which is also applied to the zero crossing comparator. The low pass filter 330 produces an average or DC offset level of the summed signal 328. Thus, as the summed signal 328 rises above, or drops below the low pass filtered version 331 of itself, the output 333 of the zero crossing comparator 332 transitions between a high and a low state, respectively. Accordingly, the magnitude of the high frequency signal 326 is set so that it does not exceed the lowest level of the received signal 328 to be considered a valid echo signal level. Thus, when a received echo signal is present, the period of the echo signal will be the major period of the summed signal 328, and when an echo signal is not present in the summed signal 328, the period of the summed signal 328 will be controlled by the high frequency signal 326, which will be substantially shorter than that of a received echo signal.

The output 333 of the zero crossing comparator 332 is fed to a counter 334 that clocks the time the output of the zero crossing comparator is asserted, and can count at the rate of the sampling clock 302 to produce a period count 360. As a result, the counter 334 counts signal period duration of the summed signal 328. As the signal magnitude of the received signal 314 diminishes, however, the effect of the high frequency signal 326 results in the period count 360 dropping from that of the digital received signal 314 (assuming an echo signal was being received) to that of the high frequency signal 326. The period duration count 360 indicates the period of a received echo signal in received signal 314 when an echo signal is being received, and indicates the period of the high frequency signal 326 when no echo signal is in the received signal 314. Consider the scenario when magnitude the received signal line 304 is essentially zero, meaning the transducer is not receiving any significant acoustic signal and is not in reverberation. As a result, the summed signal 328 will consist exclusively of the high frequency signal 326, which has a period much shorter than that of a digital received signal 314 produced when receiving an echo of a transmitted acoustic pulse or the transducer reverberation. Accordingly, the magnitude of the high frequency signal 326 should be set at or below the lowest expected magnitude of a received signal that is to be measured on received signal line 304. That level of signals on received signal line 304 can be adjusted by a receiving amplifier that amplifies signals received by the acoustic transducer.

The period count value 360 is compared to a scaled period value 364 that represents a tolerance range of the period of transmitted frequency fTx 356, such as, for example, an 18% shift in frequency higher (therefore having a shorter or smaller period value) than the frequency of the transmitted acoustic frequency. The transmitted period 356 can be provided as a transmitted period value 358 to a scaler 362 that scales the transmitted period value 358 by the desired tolerance to produce s scaled period value 364. Thus, as long as the summed signal 328 has a period magnitude within the tolerance range established by scaled period value 364, the period comparator 366 asserts (e.g. outputs a logical high level) a period comparator output 368, indicating the received signal 304 is within the tolerance range corresponding to the scaled period value 364, and therefore the signal being received is a valid echo frequency, i.e. a frequency used to measure distance acoustically. The period comparator output 368 is applied to one input of an AND gate function 370. The AND gate function performs a logical AND operation on the period comparator output 368 and the output 355 of a proximity window counter 348 that forms the time window inside which the presence of a received signal having a period value above or equal to the scaled period value 364 is evaluated. As a result, the output of the AND gate function 370 is a close proximity zone flag 384. This flag 384 is set whenever a received signal having a period value above or equal to the scaled period value 364 is received by the transducer within the time window 355.

The proximity window counter 348 generates a count 355 while the envelope 342 of the received signal 314 is below a preselected reverberation end threshold value 344, and determined by an envelope comparator 340 which provides an envelope valid signal 346 to the proximity window counter 348. Thus, the proximity window counter 348 commences a count upon the received signal 314 magnitude falling below a level indicating the substantial end of a reverberation period of the transducer, which is the start of the time when an echo from a close proximity signal can be detected. The envelope 342 can be produced by an envelope builder 336, which produces an envelope of the digital received signal 314. The envelope tracks the maximum excursions of the digital received signal 314 over time with respect to a reference (e.g. zero). The preselected reverberation end threshold value 344 represents the lowest magnitude of the reverberation signal of the transducer at which the system can commence detecting received echo signals, and can be produced by applying a scalar 338 to the full scale value 310 of the analog to digital converter 312. The proximity window counter 348 can be clocked at a divided value 352 of the sampling clock 302 as produced by a divider 350 having a divide factor Ds that can be selected as applicable.

As described, the circuit 300 utilizes inputs of a sampling clock 302, a received signal 304, and the full scale value 310, among other inputs. These inputs are used to derive other signals. For example, the scaled period value 364 can be produced by applying a scalar 362 to the transmit frequency period 356. The high frequency signal 326 level can be produced by applying a scalar 324 to a sinusoidal signal (or other signal with appropriate high frequency content) produced by a sinusoidal generator 322 that operates responsive to the analog to digital full scale value 318, which represents the maximum digital value that is output by ADC 312. The frequency of the sinusoidal generator 322 can be derived from a divided version 316 of the sampling clock 302 as produced by a divider 306. The transmit frequency period 356 can be derived from the transmit frequency 308, which can be derived by dividing the sampling clock 306 by a factor K, which can be selected based on the frequency of the sampling clock 302 and the transmitted frequency fTx.

The circuitry described thus far relates to a close proximity zone flag circuit operable to assert a close proximity zone flag 384 while a present period of a received signal from an acoustic transducer is within a range indicative of a received echo, and during a valid proximity window time period. To summarize, the close proximity zone flag circuit can, as described, include a summing node 320 operable to sum the received signal with high frequency signal 326 to produce a summed signal 328. The close proximity zone flag circuit can further include a zero crossing comparator 332 coupled to the summing node 320 and operable to compare the summed signal 328 with a low pass filtered version 331 of the summed signal 328, a counter 334 coupled to an output 333 of the zero crossing comparator 334 is operable to count the time between zero crossings of the summed signal 328 relative to the low filtered version 331 of the summed signal 328 and produce a period count 360. The period comparator 366 is coupled to an output 360 of the counter and is operable to compare the period count 360 with a scaled period value 364 to produce a period comparator output 368. The scaled period value 364 corresponds to a frequency at a preselected offset from a transmitted signal used to produce an acoustic echo, and can be set to account for expected Doppler shift. The close proximity zone flag circuit further includes an envelope builder 336 operable to generate an envelope signal 342 of the digital received signal 314. The envelope comparator 340 is operable to compare the envelope signal 342 with a preselected reverberation end threshold value 344 and produce reverberation end signal 346 while the envelope signal 324 falls below the reverberation end threshold value 344. The proximity window counter 348 is operable to produce a proximity window count 355 beyond the reverberation end point, and an AND gate 370 is operable to perform a logical AND operation on the period comparator output 368 and the proximity window count 355.

The circuit 300 also includes a time of flight circuit operable to produce a time of flight count 388 based on a time period when a stream of present periods of the received signal, after being low pass filtered, is greater than a preselected threshold value. The time of flight count 388 is output from a multiple reflection counter 382 that counts the time when a low pass filtered (372) version of the period comparator output 368 is above a receive threshold value 374, as determined by receive threshold comparator 380, which provides an output 390 to multiple reflection counter 382. The low pass filter 372 essentially averages the output 368 of the period comparator 366. The output 368 of the period comparator 366 will only be asserted when the period of the received signal 314 is substantially that of the transmitted frequency fTx. Thus, the output of the low pass filter 372 will only exceed the receive threshold value 374 when an echo signal is being received. At the end of a received echo signal, the low pass filter 372 output will fall below the receive threshold value 374, and the output 390 of the receive threshold comparator will likewise go low or otherwise de-assert.

The circuit 300 can further include a close proximity time of flight valid flag circuit operable to compare the time of flight count 388 to a valid distance threshold interval value 376 and assert a close proximity time of flight valid flag 386 when the time of flight count is inside the valid distance threshold interval. This operation can be performed by a valid time of flight comparator 378. Thus, when the time of flight count 388, as provided to the time of flight comparator 378, is less than valid distance threshold interval value 376, the close proximity time of flight valid flag 386 as output by the valid time of flight comparator 378 will be low. Once the time of flight count 388 exceeds the valid distance threshold interval value 376, the close proximity time of flight valid flag 386 as output by the valid time of flight comparator 378 will be high. Valid distance threshold interval value 376 thus represents the longest time of validity for a received echo, and corresponds to the duration of the transmitted pulse or burst. If multiple echoes are received in an overlapping manner, resulting in the time of flight count 388 exceeding the valid distance threshold interval value 376

Figure 4:
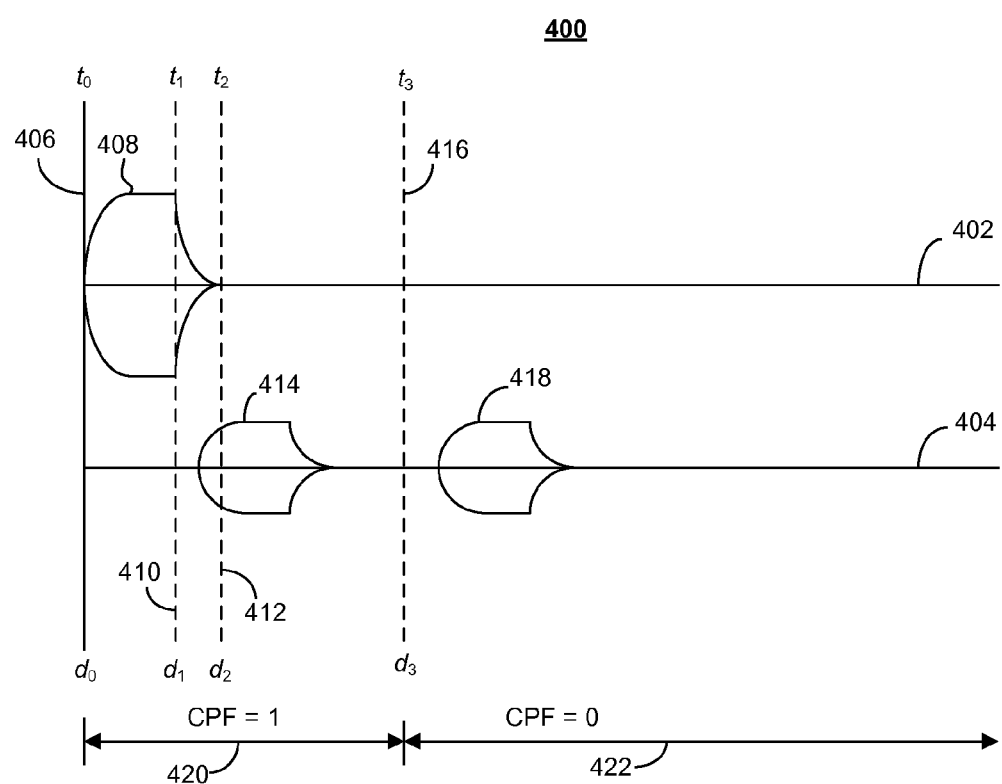
FIG. 4 shows a timing diagram of acoustic signals in an acoustic distance sensing system where an object is in close proximity to the acoustic distance sensing system in accordance with some embodiments.

FIG. 4 shows a timing diagram 400 of acoustic signals in an acoustic distance sensing system where an object is in close proximity to the acoustic distance sensing system. In the timing diagram 400, time is represented on the horizontal axis, increasing from right to left, and vertical axis represent signal magnitude, positive or negative around a respective time axis. A first time axis 402 represent a transmit pulse 408, while a second timing axis 404 shows several received echoes 414, 418. The transmit pulse 408 begins at time $t_0$ 406, and increases to its maximum magnitude, and then the driving signal producing the transmit pulse 408 is ceased at time $t_1$ 410. However, the transmit pulse 408 does not end at time $t_1$, rather, time $t_1$ is the start of a reverberation period to time $t_2$ 412. A time period 420 from time 406 to time $t_3$ 416 can be defined as corresponding to a close proximity distance where the close proximity zone flag (CPF) 384 is set. Each of the times $t_0$-$t_3$ on axis 404 correspond to distances.

First echo 414 is received during time 420, which indicates the object that produced the echo is with the defined close proximity distance defined by time 416. Furthermore echo 414 is received, in part, during the reverberation period 410-412 of the transducer as a result of the transmitted pulse 408. The circuit 300 would have the close proximity zone flag 384 set If the periodicity of echoes 414 and 418 are within the threshold interval 376, the close proximity time of flight valid flag 386 is set as well. The time of flight count 388 would indicate the real time of flight of pulse 214 so that a distance to the echo-producing object could be determined. If no echo is received inside the close proximity time 420 the close proximity zone flag 384 will not be set when echo 418 is received.

This teachings disclosed herein can be embodied in other forms without departing from the spirit or essential attributes thereof. Accordingly, reference should be made to the following claims, rather than to the foregoing specification, as indicating the scope of the invention.

I claim:

1. A semiconductor device, comprising:
   a close proximity zone flag circuit operable to assert a close proximity zone flag while a present period of a received signal from an acoustic transducer is within a preselected range during a proximity window time period;
   a time of flight circuit operable to produce a time of flight count based on a time period when a stream of present periods of the received signal, after being low pass filtered, overcrosses a preselected threshold value; and
   a close proximity time of flight valid flag circuit operable to compare the time of flight count to a valid time interval threshold value and assert a close proximity time of flight valid flag when the time of flight count is within the valid distance threshold interval.

2. The semiconductor circuit of claim 1, wherein the close proximity zone flag circuit comprises:
   a summing node operable to sum the received signal with high frequency signal to produce a summed signal;
   a zero crossing comparator coupled to the summing node and operable to compare the summed signal with a low pass filtered version of the summed signal;
   a counter coupled to an output of the zero crossing comparator and operable to count the time between zero crossings of the summed signal relative to the low filtered version of the summed signal and produce a period count;
   a period comparator coupled to an output of the counter and operable to compare the period count with a scaled period value to produce a period comparator output, the scaled period value corresponds to a frequency at a preselected offset from a transmitted signal used to produce an acoustic echo;
   an envelope builder operable to generate an envelope signal from the received signal;
   an envelope comparator operable to compare the envelope signal with a preselected reverberation end threshold value and produce reverberation end signal while the envelope signal falls below the reverberation end threshold value;
   a proximity window counter operable to produce a proximity window count when the envelope signal falls once below the reverberation end threshold value; and
   an AND gate operable to perform a logical AND operation on the period comparator output and the proximity window count.

3. The semiconductor circuit of claim 2, wherein the time of flight circuit comprises:
   a time of flight comparator operable to compare a low pass filtered version of the period comparator output with the receive period threshold value to produce a multiple reflection signal; and
   a multiple reflection counter operable to count the time when the low pass filtered version of the period comparator output is greater than the receive period threshold value to provide the time of flight count.

4. The semiconductor circuit of claim 2, comprising:
   a period divider operable to divide the period of a sampling clock to a shorter period;
   a sinusoid generator coupled to the period divider and operable to generate a raw high frequency signal based on the shorter period; and
   an attenuator coupled between an output of the sinusoid generator and the summing node operable to attenuate the raw high frequency signal to produce the high frequency signal provided to the summing node.

5. The semiconductor circuit of claim 2, wherein the high frequency signal is a noise signal that includes frequency content at frequencies higher than the received signal.

6. The semiconductor circuit of claim 2, further comprising an analog to digital converter operable to convert an analog signal produced by an acoustic transducer to a digital form to provide the received signal.

7. The semiconductor circuit of claim 2, wherein the period counter comprises a clock input coupled to a sampling clock, and wherein the period counter restarts counting at the sampling clock rate each time the output of the zero crossing comparator transitions from a low level to a high level.

8. A method, comprising:
forming a close proximity zone flag circuit operable to assert a close proximity zone flag while a present period of a received signal from an acoustic transducer is within a preselected range during a proximity window time period
forming a time of flight circuit operable to produce a time of flight count based on a time period when a stream of present periods of the received signal, after being low pass filtered, overcrosses a preselected threshold value; and
forming a close proximity time of flight valid flag circuit operable to compare the time of flight count to a valid distance interval threshold value and assert a close proximity time of flight valid flag when the time of flight count is within the valid distance interval threshold value.

9. The method of claim 8, wherein forming the close proximity zone flag circuit comprises:
forming a summing node operable to sum the received signal with high frequency signal to produce a summed signal, wherein the high frequency signal contains frequency content that is higher than a frequency of the received circuit;
forming a zero crossing comparator coupled to the summing node and operable to compare the summed signal with a low pass filtered version of the summed signal;
forming a counter coupled to an output of the zero crossing comparator and operable to count the time between zero crossings of the summed signal relative to the low filtered version of the summed signal and produce a period count;
forming a period comparator coupled to an output of the counter and operable to compare the period count with a scaled period value to produce a period comparator output, the scaled period value corresponds to a frequency at a preselected offset from a transmitted signal used to produce an acoustic echo;
forming an envelope builder operable to generate an envelope signal from the received signal;
forming an envelope comparator operable to compare the envelope signal with a preselected reverberation end threshold value and produce reverberation end signal while the envelope signal falls once below the reverberation end threshold value;
forming a proximity window counter operable to produce a proximity window count when the envelope signal falls once below the reverberation end threshold value; and
forming an AND gate operable to perform a logical AND operation on the period comparator output and the proximity window count.

10. The method of claim 9, wherein forming the time of flight circuit comprises:
forming a time of flight comparator operable to compare a low pass filtered version of the period comparator output with the receive period threshold value to produce a multiple reflection signal; and
forming a multiple reflection counter operable to count the time when the low pass filtered version of the period comparator output is greater than the receive period threshold value to provide the time of flight count.

11. The method of claim 9, further comprising:
forming a period divider operable to divide the period of a sampling clock to a shorter period;
forming a sinusoid generator coupled to the period divider and operable to generate a raw high frequency signal based on the shorter period; and
forming an attenuator coupled between an output of the sinusoid generator and the summing node operable to attenuate the raw high frequency signal to produce the high frequency signal provided to the summing node.

12. The method of claim 9, further comprising forming an analog to digital converter operable to convert an analog signal produced by an acoustic transducer to a digital form to provide the received signal.

13. The method of claim 9, wherein forming the period counter comprises forming a clock input coupled to a sampling clock, and wherein the period counter restarts counting at the sampling clock rate each time the output of the zero crossing comparator transitions from a low level to a high level.

14. An acoustic distance measuring system, comprising:
a transmitter;
an acoustic transducer coupled to the transmitter that transmit an acoustic signal corresponding to a driving signal provided the transmitter, and which receives an echo of the acoustic signal produced by an object reflecting the acoustic signal;
a sensing circuit coupled to the transducer including a close proximity zone flag circuit operable to assert a close proximity zone flag while a present period of a received signal from an acoustic transducer is within a preselected range during a proximity window time period, the sensing circuit further including a time of flight circuit operable to produce a time of flight count based on a time period when a stream of present periods of the received signal, after being low pass filtered, overcrosses a preselected threshold value, and the sensing circuit further including a close proximity time of flight valid flag circuit operable to compare the time of flight count to a valid time interval threshold value and assert a close proximity time of flight valid flag when the time of flight count is within the valid distance threshold interval.

15. The acoustic distance measuring system of claim 14, wherein the close proximity zone flag circuit comprises:
a summing node operable to sum the received signal with high frequency signal to produce a summed signal;
a zero crossing comparator coupled to the summing node and operable to compare the summed signal with a low pass filtered version of the summed signal;
a counter coupled to an output of the zero crossing comparator and operable to count the time between zero crossings of the summed signal relative to the low filtered version of the summed signal and produce a period count;
a period comparator coupled to an output of the counter and operable to compare the period count with a scaled period value to produce a period comparator output, the scaled period value corresponds to a frequency at a preselected offset from a transmitted signal used to produce an acoustic echo;

an envelope builder operable to generate an envelope signal from the received signal;

an envelope comparator operable to compare the envelope signal with a preselected reverberation end threshold value and produce reverberation end signal while the envelope signal falls below the reverberation end threshold value;

a proximity window counter operable to produce a proximity window count when the envelope signal falls once below the reverberation end threshold value; and an AND gate operable to perform a logical AND operation on the period comparator output and the proximity window count.

16. The semiconductor circuit of claim 15, wherein the time of flight circuit comprises:

a time of flight comparator operable to compare a low pass filtered version of the period comparator output with the receive period threshold value to produce a multiple reflection signal; and a multiple reflection counter operable to count the time when the low pass filtered version of the period comparator output is greater than the receive period threshold value to provide the time of flight count.

17. The acoustic distance measuring system of claim 15, comprising:

a period divider operable to divide the period of a sampling clock to a shorter period;

a sinusoid generator coupled to the period divider and operable to generate a raw high frequency signal based on the shorter period; and an attenuator coupled between an output of the sinusoid generator and the summing node operable to attenuate the raw high frequency signal to produce the high frequency signal provided to the summing node.

18. The acoustic distance measuring system of claim 15, wherein the high frequency signal is a noise signal that includes frequency content at frequencies higher than the received signal.

19. The acoustic distance measuring system of claim 15, further comprising an analog to digital converter operable to convert an analog signal produced by an acoustic transducer to a digital form to provide the received signal.

20. The acoustic distance measuring system of claim 15, wherein the period counter comprises a clock input coupled to a sampling clock, and wherein the period counter restarts counting at the sampling clock rate each time the output of the zero crossing comparator transitions from a low level to a high level.

* * * * *